United States Patent
Haran et al.

(10) Patent No.: US 10,152,182 B2
(45) Date of Patent: Dec. 11, 2018

(54) TOUCH SENSOR HAVING JUMPERS

(71) Applicant: Microsoft Technology Licensing, LLC, Redmond, WA (US)

(72) Inventors: On Haran, Kfar Saba (IL); Eliyahu Barel, Beit Aryeh (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 135 days.

(21) Appl. No.: 15/234,878

(22) Filed: Aug. 11, 2016

(65) Prior Publication Data
US 2018/0046275 A1 Feb. 15, 2018

(51) Int. Cl.
G06F 3/044 (2006.01)
G06F 3/041 (2006.01)
G06F 3/045 (2006.01)

(52) U.S. Cl.
CPC .............. G06F 3/044 (2013.01); G06F 3/045 (2013.01); G06F 3/0414 (2013.01); G06F 3/0416 (2013.01); G06F 2203/04105 (2013.01)

(58) Field of Classification Search
CPC ........ G06F 3/044; G06F 3/0414; G06F 3/045; G06F 3/0416; G06F 2203/04105
See application file for complete search history.

(56) References Cited

U.S. PATENT DOCUMENTS

| 5,008,497 A | 4/1991 | Asher |
| 8,421,483 B2 | 4/2013 | Klinghult et al. |
| 8,982,051 B2* | 3/2015 | Rosenfeld ........... G06F 3/03543 345/163 |
| 8,982,081 B2 | 3/2015 | Li |
| 8,988,384 B2 | 3/2015 | Krah et al. |
| 9,317,140 B2* | 4/2016 | Rosenfeld ........... G06F 3/03543 |
| 2010/0053116 A1 | 3/2010 | Daverman et al. |
| 2010/0117981 A1* | 5/2010 | Chen ...................... G06F 3/044 345/174 |

(Continued)

FOREIGN PATENT DOCUMENTS

| JP | 2015170178 A | 9/2015 |
| WO | 2013005861 A1 | 1/2013 |

OTHER PUBLICATIONS

Kim, et al., "Development of a Carbon Nanotube-Based Touch-screen Capable of Multi-Touch and Multi-Force Sensing", In Journal of Sensors, vol. 15, Nov. 13, 2015, pp. 28732-28741.

(Continued)

Primary Examiner — Peter D McLoone
(74) Attorney, Agent, or Firm — Alleman Hall Creasman & Tuttle LLP

(57) ABSTRACT

Examples are disclosed herein that relate to sensing touch input and applied force at a common sensor using a common controller. One example provides a touch sensor with (1) a plurality of electrodes forming a transmit electrode array and a receive electrode array; (2) drive circuitry configured to drive the transmit electrode array; (3) receive circuitry coupled to at least the receive electrode array; (4) and one or more jumpers electrically coupling respective pairs of the electrodes, the one or more jumpers having an electrical resistance that varies with applied force. The touch sensor may include a controller configured to determine, based on output from the receive circuitry, a location of a touch input and an applied force of the touch input based on a capacitance associated with the output and on a resistance associated with the output.

19 Claims, 3 Drawing Sheets

(56) References Cited

U.S. PATENT DOCUMENTS

| | | |
|---|---|---|
| 2010/0123686 A1 | 5/2010 | Klinghult et al. |
| 2010/0201635 A1 | 8/2010 | Klinghult et al. |
| 2010/0242274 A1* | 9/2010 | Rosenfeld ............ G06F 3/03543 29/848 |
| 2010/0245246 A1 | 9/2010 | Rosenfeld et al. |
| 2012/0013573 A1 | 1/2012 | Liu et al. |
| 2012/0092279 A1 | 4/2012 | Martin |
| 2012/0105358 A1 | 5/2012 | Momeyer et al. |
| 2013/0009905 A1* | 1/2013 | Castillo .................. G06F 3/044 345/174 |
| 2014/0098058 A1 | 4/2014 | Baharav et al. |
| 2014/0168153 A1 | 6/2014 | Deichmann et al. |

OTHER PUBLICATIONS

"Capacitive pressScreen", Published on: Feb. 17, 2016 Available at: http://www.pressscreen.info/technology/.

"Force Sensitive Resistor", Published on: Nov. 23, 2009 Avaliable at: https://www.sparkfun.com/datasheets/Sensors/Pressure/fsrguide.pdf.

Rendl, et al., "PyzoFlex: Printed Piezoelectric Pressure Sensing Foil", In Proceedings of ACM 25th Symposium on User Interface Software and Technology, Oct. 7, 2012, 10 pages.

Evans, Jonny, "Apple's Force Touch trackpad: What you need to know", Published on: Mar. 16, 2015 Available at: http://www.computerworld.com/article/2896731/apple-s-force-touch-trackpad-what-you-need-to-know.html.

Benedict, "PrintPut integrates simple touch and pressure sensors directly into 3D printed objects", Published on: Sep. 20, 2015 Available at: http://www.3ders.org/articles/20150920-printput-integrates-simple-touch-and-pressure-sensors-directly-into-3d-printed-objects.html.

"International Search Report and Written Opinion Issued in PCT Application No. PCT/US2017/045205", dated Nov. 10, 2017, 11 Pages.

* cited by examiner

TOUCH SENSOR HAVING JUMPERS

BACKGROUND

Various approaches for sensing touch input on a display device have been developed. A touch-sensitive display device, for example, may include a touch sensor for receiving touch input. Some touch-sensitive display devices are also configured to measure force applied to a display surface, for example by using a discrete force sensor provided separately from a touch sensor.

DETAILED DESCRIPTION

As described above, various approaches for sensing touch input have been developed. A touch-sensitive display device, for example, may include a touch sensor for receiving touch input. Some touch-sensitive display devices are also configured to measure force applied to a display surface by utilizing a discrete force sensor provided separately from the touch sensor. The use of separate sensors for respectively sensing touch input and applied force can introduce added cost and complexity. Separate controllers can also introduce latencies that can detract from the user experience.

Accordingly, examples are disclosed herein that sense touch input and applied force at a common sensor using a common controller. One example provides a touch sensor with (1) a plurality of electrodes forming a transmit electrode array and a receive electrode array; (2) drive circuitry configured to drive the transmit electrode array; (3) receive circuitry coupled to at least the receive electrode array; (4) and one or more jumpers electrically coupling respective pairs of the electrodes, the one or more jumpers having an electrical resistance that varies with applied force. The touch sensor may include a controller configured to determine, based on output from the receive circuitry, a location of a touch input and an applied force of the touch input based on a capacitance associated with the output and on a resistance associated with the output.

Figure 1:
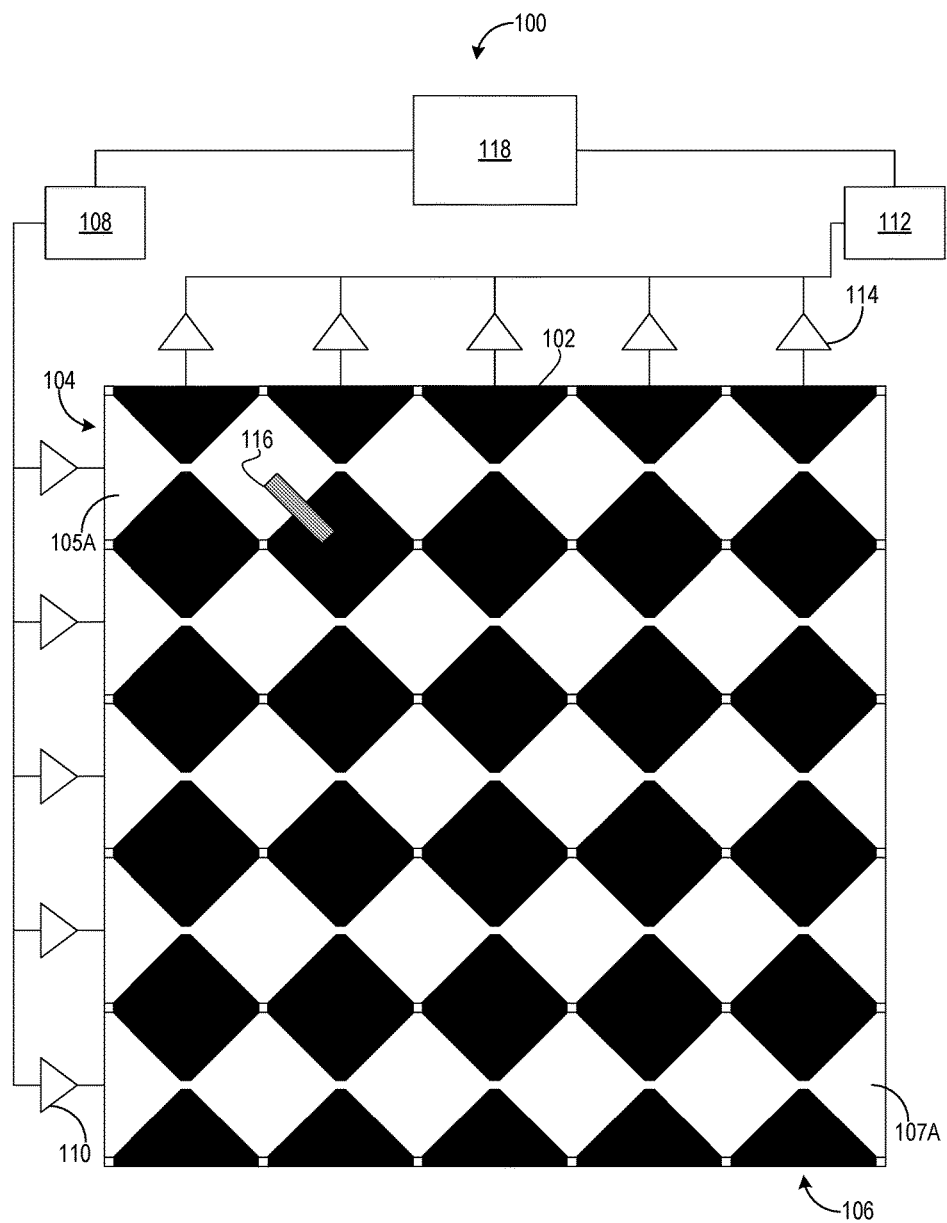
FIG. 1 shows an example touch sensor including a plurality of electrodes.

FIG. 1 shows an example touch sensor 100 including a plurality of electrodes such as electrode 102. The plurality of electrodes 102 form a transmit electrode array 104 and a receive electrode array 106, which in the depicted example are arranged as row electrodes and column electrodes, respectively. Further, in this example, electrodes 102 are arranged in a diamond-like configuration on one side of a suitable substrate (e.g., glass), which is not shown in FIG. 1. Accordingly, as in this example, touch sensor 100 may be implemented as a single-sided indium tin oxide (SITO) on-cell/on-glass touch sensor. Touch sensor 100 may assume alternative forms, however, including those in which transmit and receive electrode arrays 104 and 106 are respectively implemented as column and row electrodes, and/or the plurality of electrodes 102 are arranged in other geometric forms and comprised of any suitable material. Implementations in which transmit and receive electrode arrays 104 and 106 are provided on respective opposite sides of a substrate are also contemplated—e.g., as part of a dual-sided indium tin oxide (DITO) touch sensor. An example DITO touch sensor is described below with reference to FIG. 3.

Touch sensor 100 includes drive circuitry 108 configured to drive transmit electrode array 104. Drive circuitry 108 may include individual drive circuits such as drive circuit 110, each of which is configured to selectively drive a respective transmit electrode (e.g., transmit electrode 105A). Touch sensor 100 further includes receive circuitry 112 coupled to receive electrode array 106, where the receive circuitry may include individual receive circuits such as receive circuit 114, each of which is coupled to a respective receive electrode (e.g., receive electrode 107A). In this configuration, receive circuitry 112 is operable to selectively receive output from one or more receive electrodes 107. The output may arise from the driving of one or more transmit electrodes 105 via drive circuitry 108, and may vary with the capacitance-influencing presence of input objects (e.g., human hand) proximate to touch sensor 100. Changes in the output may be observed and interpreted as user input, which may affect aspects of a computing device and/or display device not shown in FIG. 1, for example. To enable capacitive detection of touch input in this manner, drive circuitry 108 may apply any suitable signal(s) (e.g., AC voltage sequences) to any suitable subset of transmit electrodes 105 in any suitable sequence.

Capacitive coupling/paths formed between transmit and receive electrode arrays 104 and 106 as described above may be accompanied by the inclusion of resistive paths formed between transmit and receive electrodes. As the capacitance between transmit and receive electrode arrays 104 and 106 may vary with the presence of input objects, thereby enabling the detection of input object location, the resistance of such resistive paths may vary with applied force, thereby enabling force measurement—e.g., force imparted to touch sensor 100 and applied to a surface external to the touch sensor (e.g., a transparent display surface when implemented in a touch-sensitive display device) by the input object. To this end, touch sensor 100 includes one or more jumpers that electrically (e.g., physically) couple respective pairs of electrodes and have an electrical resistance that varies with applied force. As one example, FIG. 1 shows a jumper 116 electrically coupling a transmit electrode 105 and an adjacent receive electrode 107. By driving this transmit electrode 105, receiving resulting output at this receive electrode 107, and observing changes to the resistance measured in such output, the force applied in this region can be measured.

To determine a location of touch input and an applied force of the touch input, touch sensor 100 includes a controller 118 that receives output from receive circuitry 112. In one example, the output (e.g., voltage, current) received from receive circuitry 112 may include or be a function of a complex impedance as follows: $Z=(1/R+j\omega C)^{-1}$, where Z is complex impedance, R is resistance, j is the imaginary unit, w is angular frequency, and C is capacitance. As such, controller 118 may measure, based on the output received from receive circuitry 112, a magnitude and a phase of the complex impedance, and solve for the capacitance and the resistance which yield the complex impedance (e.g., satisfy the relation characterizing the complex impedance). As one unique set of R and C values exists for a given Z, the R and C values corresponding to a measured Z can be definitively determined. Controller 118 may thus determine a location of touch input (e.g., according to the determined C value) and the force applied by that touch input (e.g., according to the determined R value).

By leveraging the variable capacitance and resistance between transmit and receive electrodes as described above, both the location of a touch input and the applied force associated with that touch input can be obtained at each node of touch sensor 100. The measurement of both capacitance (e.g., which parameterizes touch input presence/location) and resistance (e.g., which parameterizes applied force) is accomplished using a common sensor structure (e.g., touch sensor 100) and a common controller (e.g., controller 118), reducing the cost and complexity of implementing force and touch and/or hover sensing relative to approaches that use separate sensor structures for respectively sensing touch input and applied force and/or that utilize separate controllers for respectively processing capacitive and resistive output. The measurement of touch/hover input and applied force may facilitate a more accurate assessment of user intent, as more context regarding user input is available. Further, the latency of input processing and potential provision of resultant output may be reduced by assessing touch/hover input and applied force at controller 118, providing a more responsive and overall enhanced user experience.

To avoid saturating receive circuitry 112, and requiring an excessively large dynamic range of the receive circuitry, it may be desired that the impedance of capacitive paths in touch sensor 100 are substantially equal to the impedance of resistive paths of the one or more jumpers 116. The capacitive paths may be induced by driving transmit electrode array 104, resulting in capacitive coupling with one or more receive electrodes 107. As one example, typical capacitances between transmit and receive electrodes 105 and 107 may be on the order of 1 pF. At typical driving frequencies, an impedance along capacitive paths on the order of 1 MΩ may result. A resistance of the resistive paths of jumpers 116 on this order may thus be desired. As the resistance of jumpers 116 may vary as a function of their dimensions (e.g., length, width) and material resistivity, these parameters may be selected in view of the desired resistance range described above. FIG. 1 represents an example in which the one or more jumpers 116 are comprised of materials with relatively high conductivity/low resistivity, and as such are configured to be relatively long and thin—e.g., 10 μm in a width dimension and 1000 μm in a length dimension. Alternative arrangements are contemplated, however; examples in which coiled jumpers, and contiguous pressure-sensitive layers, are used are described below with reference to FIGS. 2-4.

Figure 2:
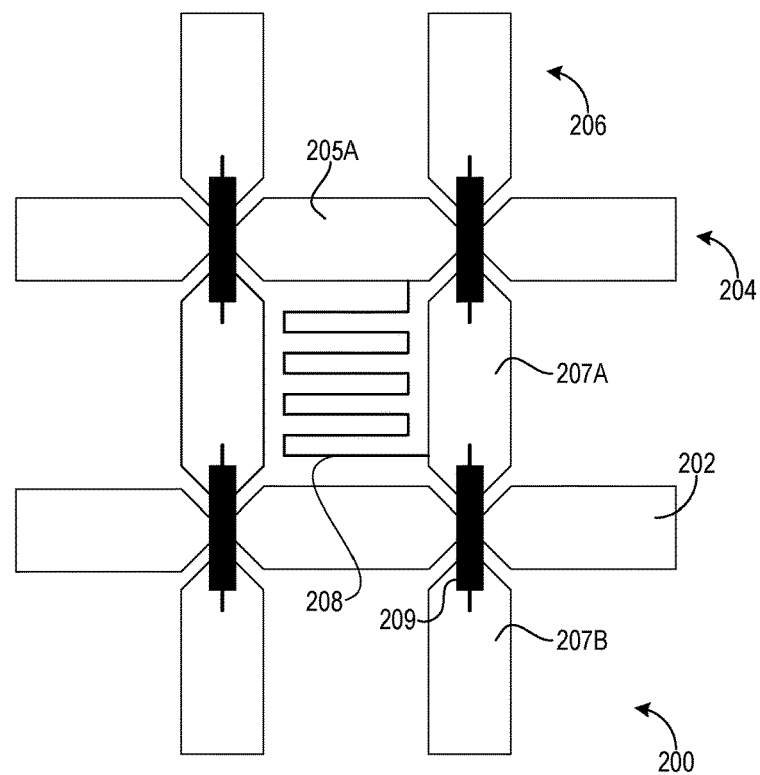
FIG. 2 shows an example electrode arrangement that may be implemented in a touch sensor.

FIG. 2 shows an example electrode arrangement 200 that may be implemented in a touch sensor. Electrode arrangement 200 includes a plurality of electrodes (e.g., electrode 202) that form a transmit electrode array 204 and a receive electrode array 206. Transmit and receive electrode arrays 204 and 206 are respectively implemented as row and column electrodes on the same side of a suitable substrate not shown in FIG. 2, where adjacent receive electrodes (e.g., receive electrodes 207A and 207B) are electrically coupled via respective bridge structures (e.g., bridge structure 209). Similar bridge structures not shown in FIG. 2 may electrically couple adjacent transmit electrodes, or each transmit electrode row may be formed contiguously, for example. As such, electrode arrangement 200 may be implemented as a SITO touch sensor. Other suitable arrangements are contemplated, however. Further, while not shown in FIG. 2, transmit electrode array 204 and receive electrode array 206 may be respectively coupled to drive circuitry (e.g., drive circuitry 108 of FIG. 1) and receive circuitry (e.g., receive circuitry 112 of FIG. 1) to enable capacitive sensing as described above. A controller such as controller 118 of FIG. 1 and not shown in FIG. 2 may be provided to effect the approaches described herein.

To enable sensing of applied force (e.g., force imparted to electrode arrangement 200 and applied to an external surface), the electrode arrangement includes one or more jumpers such as a jumper 208 having a resistance that varies with the applied force. More particularly, the one or more jumpers 208 electrically couple adjacent transmit and receive electrodes (e.g., transmit electrode 205A and receive electrode 207A) along a sinuous, coiled path. The coiled configuration of jumper 208 may represent an approach in which the material composition of the jumper exhibits a relatively low resistivity/high conductivity, and as such the jumper is configured to be relatively long and thin to obtain a desired resistance that is commensurate with the impedance of capacitive paths in electrode arrangement 200 as described above. Jumper 208 may thus be referred to as a coiled wire, though other arrangements including non-coiled configurations are possible. Generally, the coiled configuration of jumper 208 represents one approach to achieving desired electrical (e.g., resistive) properties in a jumper by selecting its geometric attributes based on such desired electrical properties, and in particular by choosing length and width ranges of the jumper, as these and other potential dimensional and geometric attributes affect the electrical (e.g., resistive) properties of the jumper as described above.

While not shown in FIG. 2, jumpers 208 may be provided for two or more pairs, and in some examples each pair, of transmit and receive electrodes 205 and 207—e.g., in the corresponding space between the adjacent transmit and receive electrodes. In some examples, the one or more jumpers 208 may be arranged in the spaces between adjacent transmit and receive electrodes 205 and 207 in lieu of so-called "dummy" electrode material, which may be provided to reduce display artifacts and/or the contrast between display areas occluded by electrode material and those not occluded by electrode material, for example. In this way, the reduction of display artifacts and/or display contrast can be provided by elements that provide sensing functionality.

Figure 3:
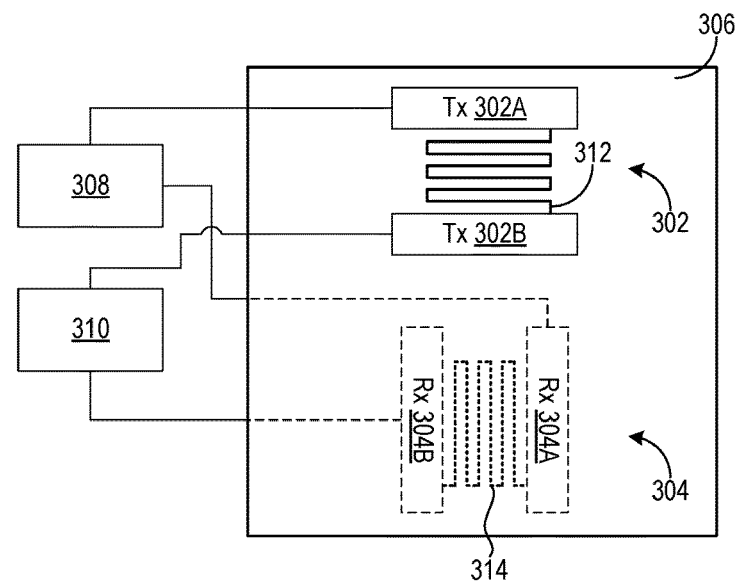
FIG. 3 shows another example touch sensor including a plurality of electrodes.

FIG. 3 shows an example touch sensor 300 including a plurality of electrodes that form a transmit electrode array 302 and a receive electrode array 304. Transmit and receive electrode arrays 302 and 304 are separated by a substrate 306 and arranged on opposite sides thereof. As such, touch sensor 300 may be implemented as a DITO touch sensor. The arrangement of receive electrode array 304 on the rear surface of substrate 306—e.g., the surface farther away as perceived in FIG. 3—is represented by the dashed appearance of the receive electrode array and associated components. Further, FIG. 3 represents an approach in which one or more pairs of electrodes of transmit electrode array 302 and/or of receive electrode array 304 can be electrically coupled such that the coupled pairs provide both driving and receiving functionality. In particular, FIG. 3 shows an electrode pair of transmit electrode array 302 including a first transmit electrode 302A electrically coupled to a second transmit electrode 302B. First transmit electrode 302A is electrically coupled to and driven by drive circuitry 308, while second transmit electrode 302B is electrically coupled to receive circuitry 310, which receives output from the second transmit electrode. Alternatively or additionally, a receive electrode pair may include a first receive electrode 304A electrically coupled to a second receive electrode 304B, with the first receive electrode being electrically coupled to and driven by drive circuitry 308, and the second receive electrode being electrically coupled to receive circuitry 310, which receives output from the second receive electrode.

Transmit and/or receive electrodes that form electrode pairs via electrical coupling may be coupled through respective jumpers that enable force sensing. As examples, FIG. 3 shows transmit electrodes 302A and 302B electrically coupled through a jumper 312, and receive electrodes 304A and 304B electrically coupled through a jumper 314. Jumpers 312 and 314 may be comprised of a force-sensitive material whose resistance varies with the force applied to touch sensor 300 as described above, and may assume a sinuous, coiled configuration for impedance-matching purposes as also described above. In view of the potential configuration of touch sensor 300, highly granular capacitive presence/location sensing and resistive force sensing may be achieved by providing both driving and receiving functions in at least one common electrode array. Further, the cost and complexity of implementing such sensing may be reduced by sharing drive and receive circuitry 308 and 310 between transmit and receive electrode arrays 302 and 304. While not shown in FIG. 3, touch sensor 300 may include a controller (e.g., controller 118 of FIG. 1) to effect the approaches described herein.

Drive circuitry 308 may be configured to specifically enable electrode driving and receiving in a common electrode array in various suitable manners. For example, first transmit electrode 302A may be driven to induce output on second transmit electrode 302B. When applied to a plurality of transmit electrodes, a first subset (e.g., first half) of transmit electrodes may thus be driven, and induced outputs received on a second, different subset (e.g., second half) of transmit electrodes. In one example, transmit electrode pairs of a plurality of transmit electrodes may be sequentially scanned such that a first transmit electrode in a transmit electrode pair is driven and induced output received on a second transmit electrode in the pair, followed by similar scanning of a next transmit electrode pair, etc.—e.g., until the entire plurality of transmit electrodes are scanned. As another example, different drive signals may be applied to different transmit electrodes—e.g., a transmit electrode in a first transmit electrode pair may be driven with a first drive signal, while a transmit electrode in a second, different transmit electrode pair may be driven with a second, different drive signal. Analogous approaches may be applied to receive electrode array 304.

The jumpering of electrodes of a common electrode array as illustrated in FIG. 3 may enable force sensing for DITO touch sensor configurations in which intervening substrates such as substrate 306 render the jumpering of transmit electrodes to receive electrodes impractical. In such dual-sided configurations, the electrode drive mode described above for force sensing (e.g., driving one transmit electrode of a transmit electrode pair and receiving at the other transmit electrode of the pair, and sequentially scanning other transmit electrode pairs) may alternate with an electrode drive mode for capacitive presence/location sensing. A controller (e.g., controller 118 of FIG. 1) may switch between the drive modes based on any suitable criteria (e.g., at regular or irregular intervals, in response to suspected touch input, in response to user input). Alternatively, a common drive mode for driving transmit electrode array 302 that facilities both capacitive and resistive sensing may be used. In this example, the driving of transmit electrode 302A may cause a resultant output on transmit electrode 302B, which can be used to sense applied force as described above, as well as causing a resultant output on one or more receive electrodes that can be used to capacitively sense presence/location—e.g., on receive electrode 304B and/or other receive electrodes coupled to receive circuitry 310. Receive electrode array 304 may be driven according to the drive mode for force sensing described above (e.g., drive receive electrode 304A, receive output at receive electrode 304B, and sequentially scan other receive electrode pairs) in addition to driving transmit electrode array 302 according to the drive mode for capacitive presence/location sensing.

Figure 4:
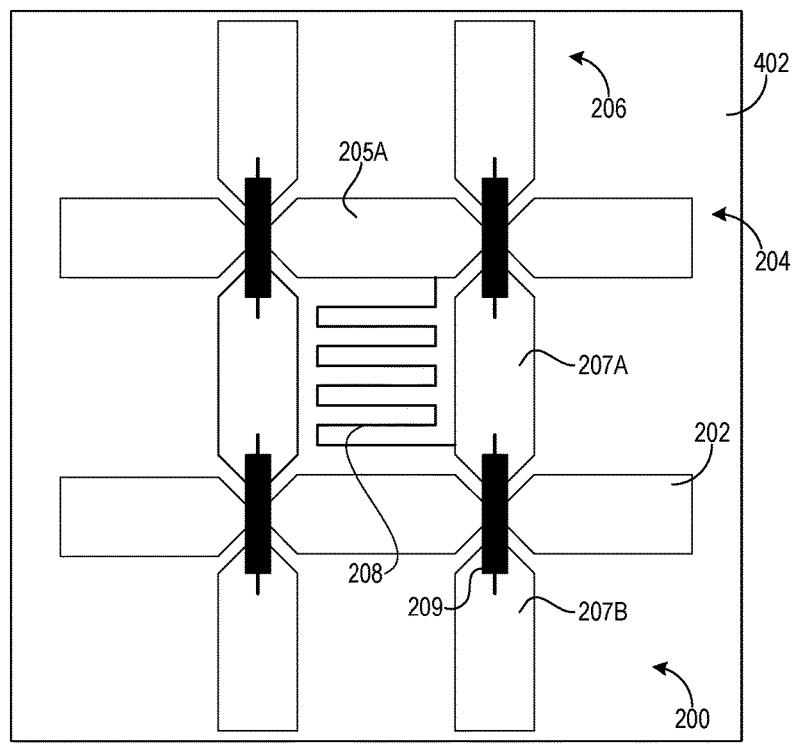
FIG. 4 shows another example electrode arrangement that may be implemented in a touch sensor.

FIG. 4 shows an example electrode arrangement 400 that may be implemented in a touch sensor. In some examples, electrode arrangement 400 may be a modified version of electrode arrangement 200. As such, similar or shared aspects between electrode arrangements 200 and 400 are not repeated here.

Electrode arrangement 400 includes transmit electrode array 204 and receive electrode array 206, with adjacent transmit and receive electrodes being electrically coupled to enable capacitive input sensing and resistive force sensing through jumpers such as jumper 208 as described above. However, electrode arrangement 400 further includes a pressure-sensitive layer 402 having a resistance that varies with applied force. The variable resistance of layer 402 may combine with the variable resistance of jumpers 208 to increase the sensitivity of force sensing. While depicted as a single-sided arrangement (e.g., SITO touch sensor), electrode arrangement 400 including layer 402 may be implemented as dual-sided arrangement (e.g., DITO touch sensor). In the dual-sided implementation, transmit electrode array 204 may be separated from receive electrode array 206 by layer 402, and potentially other elements such as a substrate. FIG. 4 may represent an approach in which layer 402 is arranged as a relatively wide, and in some examples contiguous, layer to obtain desired impedance-matching, as the material composition of the layer exhibits a relatively high resistivity/low conductance. In other examples, relatively wide, discrete strips of pressure-sensitive material may be used in lieu of layer 402. Generally, electrode arrangement 400 may be configured to include jumpers 208 and not pressure-sensitive layer 402, the pressure-sensitive layer without the jumpers, or may include both the pressure-sensitive layer and the jumpers. Pressure-sensitive layer 402 may be electrically coupled to one or more jumpers 208 and/or to one or both of transmit electrode array 204 and receive electrode array 206.

Various modifications to the touch sensors and electrode arrangements described herein are contemplated. As one example, the jumpers described herein, such as jumpers 208, 312 and/or 314, may be configured as strain gauges, alternatively or in addition to their configuration as force-sensitive variable resistors. For example referring to FIG. 2, jumper 208 may be configured as a strain gauge having a resistance that varies with forces in the x and/or y directions—e.g., in orthogonal directions parallel to the page of FIG. 2—under pressure along the z direction (e.g., orthogonal or into the page of FIG. 2). As another example referring to FIG. 4, jumper 208 may be configured as a strain gauge having a resistance that varies with forces in the x and/or y directions—e.g., in orthogonal directions parallel to the page of FIG. 4—under pressure along the z direction. In this example, pressure-sensitive layer 402 may have a resistance that varies with force applied in the z direction, such that the layer in combination with jumpers 208 provides force sensing in the x, y, and z directions. In yet other examples, layer 402 may be provided in lieu of jumpers to provide resistive measurement of applied force. The jumpers described herein may be comprised of any suitable material(s), including but not limited to silicon, polysilicon, piezo-resistive materials, ITO composites, carbon nanotube materials, etc.

Figure 5:
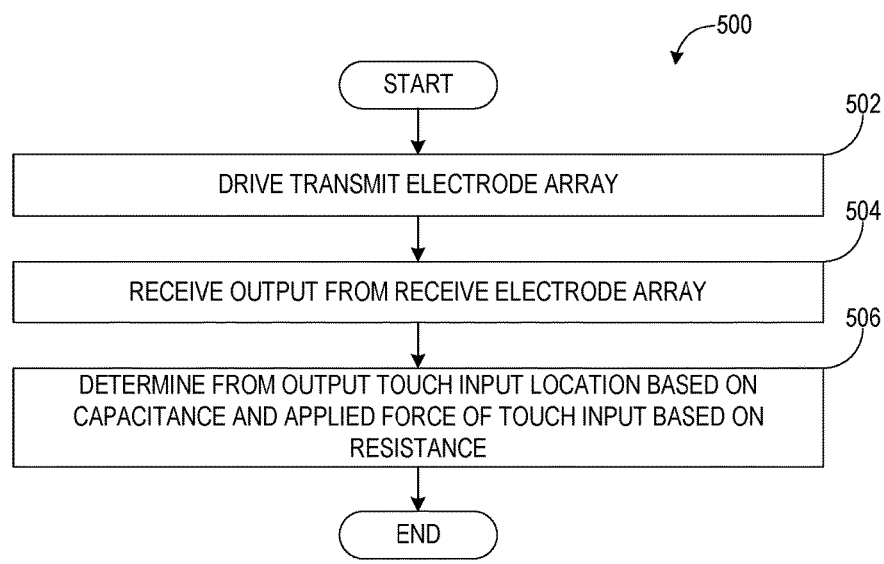
FIG. 5 shows a flowchart illustrating a method of input sensing.

FIG. 5 shows a method 500 of input sensing. Method 500 may be implemented using touch sensor 100 (FIG. 1), electrode arrangement 200 (FIG. 2), touch sensor 300 (FIG. 3), and/or electrode arrangement 400 (FIG. 4), for example. As such, references to FIGS. 1-4 are made throughout the description of FIG. 5.

At 502, method 500 includes driving a transmit electrode array. The transmit electrode array may be transmit electrode array 104, and drive circuitry such as drive circuitry 108 may be used to drive the transmit electrode array, for example. Driving the transmit electrode array may include driving any suitable subset of transmit electrodes in the array using any suitable drive signal(s) in any suitable sequence.

At 504, method 500 includes receiving output from a receive electrode array. The transmit and receive electrodes may be formed by a plurality of electrodes. The receive electrode array may be receive electrode array 106, for example. The output may be induced by driving of the transmit electrode array via capacitive coupling between the transmit and receive electrode arrays, and the output may be received on any suitable subset of receive electrodes in the receive electrode array. Receive circuitry such as receive circuitry 112 may be used to receive the output, for example.

At 506, method 500 includes determining from the output a location of a touch input based on a capacitance associated with the output, and an applied force of the touch input based on a resistance associated with the output. A controller such as controller 118 may be used to determine the capacitance and resistance. The output may be a function of a complex impedance, and determining the location and the applied force of the touch input may include solving for the capacitance and the resistance which yield the complex impedance based on a magnitude and a phase of the complex impedance (e.g., as measured via the received output). The capacitance may be a function of capacitive coupling between the transmit and receive electrode array. The resistance may be a function of the variable resistance of one or more jumpers that electrically couple jumpered pairs of the plurality of electrodes and/or of a variable resistance of a pressure-sensitive layer such as layer 402. The resistance of the jumpers may vary with the applied force (e.g., in x, y, and/or z directions). The jumpers may electrically couple pairs of transmit and receive electrodes, pairs of transmit electrodes, and/or pairs of receive electrodes. Thus, capacitive and resistive measurements may be obtained for pairs of transmit electrodes and/or for pairs of receive electrodes. As such, the receive electrode array may be driven and/or output may be received from the transmit electrode array. The jumpers may be jumpers 208, for example, and may be arranged as sinuous, coiled, relatively long and thin wires (e.g., for low resistivity/high conductivity jumper materials). The jumpers may be implemented as relatively wide contiguous layers or discrete strips—e.g., as a contiguous pressure-sensitive layer such as layer 402 for high resistivity/low conductivity jumper materials. In one example, both jumpers and a pressure-sensitive layer may be provided. The capacitance and resistance may be determined based on a measured magnitude and phase of the output. The impedance of a capacitive path induced by driving the transmit electrode array may be substantially equal to an impedance of a resistive path of the jumpers.

In some implementations, the functions performed by a controller (e.g., controller 118 of FIG. 1) described herein, which may include but are not limited to the control of drive circuitry (e.g., drive circuitry 108 of FIG. 1, drive circuitry 308 of FIG. 3) such as the effectuation of drive signal application, reception of output from receive circuitry (e.g., receive circuitry 112 of FIG. 1, receive circuitry 310 of FIG. 3), and interpretation of the output (e.g., measurement of electrical parameters of the output such as voltage, current, complex impedance, magnitude, phase, determination of capacitance and/or resistance, determination of touch input location and/or applied force), may be implemented in instructions stored in a storage machine (e.g., memory) and that are executable by a logic machine (e.g., processor).

The logic machine may include one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

The storage machine may include one or more physical devices configured to hold instructions executable by the logic machine to implement the methods and processes described herein. When such methods and processes are implemented, the state of the storage machine may be transformed—e.g., to hold different data. For example, the instructions may be executable to drive a transmit electrode array; receive output from a receive electrode array, the transmit and receive electrode arrays formed by a plurality of electrodes; and determine from the output a location of a touch input based on a capacitance associated with the output, and an applied force of the touch input based on a resistance associated with the output, where one or more jumpers electrically couple respective pairs of electrodes, the one or more jumpers having an electrical resistance that varies with the applied force.

The storage machine may include removable and/or built-in devices. The storage machine may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage machine may include volatile, nonvolatile, dynamic, static, read/write, read-only, random-access, sequential-access, location-addressable, file-addressable, and/or content-addressable devices.

It will be appreciated that the storage machine may include one or more physical devices. However, aspects of the instructions described herein alternatively may be propagated by a communication medium (e.g., an electromagnetic signal, an optical signal, etc.) that is not held by a physical device for a finite duration.

Aspects of the logic machine and the storage machine may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of a computing system implemented to perform a particular function. In some cases, a module, program, or engine may be instantiated via the logic machine executing instructions held by storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

The subject matter of the present disclosure is further described in the following paragraphs. One aspect provides a touch sensor comprising a plurality of electrodes forming a transmit electrode array and a receive electrode array, drive circuitry configured to drive the transmit electrode array, receive circuitry coupled to at least the receive electrode array, one or more jumpers electrically coupling respective pairs of the electrodes, the one or more jumpers having an electrical resistance that varies with applied force, and a controller configured to determine, based on output from the receive circuitry, a location of a touch input and an applied force of the touch input based on a capacitance associated with the output and on a resistance associated with the output. In this aspect, the output alternatively or additionally may be a function of a complex impedance, and the controller alternatively or additionally may be configured to solve for the capacitance and the resistance which yield the complex impedance based on a magnitude and a phase of the complex impedance. In this aspect, an impedance of a capacitive path induced by driving the transmit electrode array alternatively or additionally may be substantially equal to an impedance of a resistive path of the one or more jumpers. In this aspect, the respective pairs of electrodes electrically coupled by the one or more jumpers alternatively or additionally may each include a transmit electrode of the transmit electrode array and a receive electrode of the receive electrode array. In this aspect, the respective pairs of electrodes electrically coupled by the one or more jumpers alternatively or additionally may each include one of a transmit electrode pair of the transmit electrode array and a receive electrode pair of the receive electrode array. In this aspect, the receive circuitry alternatively or additionally may be further coupled to the transmit electrode array, and the respective pairs of electrodes coupled by the one or more jumpers alternatively or additionally may each include a transmit electrode pair of the transmit electrode array. In this aspect, for each respective pair of electrodes, the drive circuitry alternatively or additionally may be configured to drive a first transmit electrode of the electrode pair, and the controller alternatively or additionally may be configured to receive output from a second transmit electrode of the electrode pair. In this aspect, the respective pairs of electrodes coupled by the one or more jumpers alternatively or additionally may each include a receive electrode pair of the receive electrode array, where, for each respective pair of electrodes, the drive circuitry alternatively or additionally may be configured to drive a first receive electrode of the electrode pair, and the controller alternatively or additionally may be configured to receive output from a second receive electrode of the electrode pair. In this aspect, for each respective pair of electrodes, the drive circuitry alternatively or additionally may be configured to drive a first receive electrode of the electrode pair, and the controller alternatively or additionally may be configured to receive output from a second receive electrode of the electrode pair. In this aspect, each of the one or more jumpers alternatively or additionally may be coiled. In this aspect, the touch sensor alternatively or additionally may comprise a pressure-sensitive layer having an electrical resistance that varies with the applied force, and the resistance associated with the output alternatively or additionally may be a function of the electrical resistance of the one or more jumpers and the electrical resistance of the pressure-sensitive layer.

Another aspect provides a method of input sensing comprising driving a transmit electrode array, receiving output from a receive electrode array, the transmit and receive electrode arrays formed by a plurality of electrodes, and determining from the output a location of a touch input based on a capacitance associated with the output, and an applied force of the touch input based on a resistance associated with the output, where one or more jumpers electrically couple respective pairs of electrodes, the one or more jumpers having an electrical resistance that varies with the applied force. In this aspect, the output alternatively or additionally may be a function of a complex impedance, and determining the location and the applied force of the touch input alternatively or additionally may include solving for the capacitance and the resistance which yield the complex impedance based on a magnitude and a phase of the complex impedance. In this aspect, the method alternatively or additionally may comprise driving the receive electrode array. In this aspect, the method alternatively or additionally may comprise receiving output from the transmit electrode array. In this aspect, the respective pairs of electrodes electrically coupled by the one or more jumpers alternatively or additionally may each include a transmit electrode of the transmit electrode array and a receive electrode of the receive electrode array. In this aspect, the respective pairs of electrodes electrically coupled by the one or more jumpers alternatively or additionally may each include one of a transmit electrode pair of the transmit electrode array and a receive electrode pair of the receive electrode array.

Another aspect provides a touch sensor comprising a plurality of electrodes forming a transmit electrode array and a receive electrode array, drive circuitry coupled to at least some of the electrodes, receive circuitry coupled to at least some of the electrodes, the drive circuitry being configured to drive one or more electrodes of the transmit electrode array to induce, via capacitive coupling to the receive electrode array, an output on one or more electrodes of the receive electrode array that is processed by the receive circuitry to determine a location of a touch input, and one or more jumpers electrically coupling jumpered pairs of the plurality of electrodes, the one or more jumpers having a resistance that varies with applied force, where for a given jumpered pair of the electrodes, the drive circuitry is configured to drive one electrode of the jumpered pair to induce, via a jumpered resistive path between the two electrodes of the jumpered pair, an output on the other electrode of the jumpered pair, such output being processed at the receive circuitry to determine an applied force of the touch input. In this aspect, the jumpered pairs alternatively or additionally may include a first transmit electrode and a second transmit electrode. In this aspect, the jumpered pairs alternatively or additionally may include a first receive electrode and a second receive electrode.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A touch sensor, comprising:
   a plurality of electrodes forming a transmit electrode array and a receive electrode array;
   drive circuitry configured to drive the transmit electrode array;
   receive circuitry coupled to at least the receive electrode array;
   one or more jumpers electrically coupling respective pairs of the electrodes, the one or more jumpers having an electrical resistance that varies with applied force; and
   a controller configured to determine, based on output from the receive circuitry, a location of a touch input and an applied force of the touch input based on a capacitance associated with the output and on a resistance associated with the output,
   where an impedance of a capacitive path induced by driving the transmit electrode array is substantially equal to an impedance of a resistive path of the one or more jumpers.

2. The touch sensor of claim 1, where the output is a function of a complex impedance, and where the controller is configured to solve for the capacitance and the resistance which yield the complex impedance based on a magnitude and a phase of the complex impedance.

3. The touch sensor of claim 1, where the respective pairs of electrodes electrically coupled by the one or more jumpers each include a transmit electrode of the transmit electrode array and a receive electrode of the receive electrode array.

4. The touch sensor of claim 1, where the respective pairs of electrodes electrically coupled by the one or more jumpers each include one of a transmit electrode pair of the transmit electrode array and a receive electrode pair of the receive electrode array.

5. The touch sensor of claim 1, where the receive circuitry is further coupled to the transmit electrode array, and where the respective pairs of electrodes coupled by the one or more jumpers each include a transmit electrode pair of the transmit electrode array.

6. The touch sensor of claim 5, where, for each respective pair of electrodes, the drive circuitry is configured to drive a first transmit electrode of the electrode pair, and where the controller is configured to receive output from a second transmit electrode of the electrode pair.

7. The touch sensor of claim 1, where the respective pairs of electrodes coupled by the one or more jumpers each include a receive electrode pair of the receive electrode array, where, for each respective pair of electrodes, the drive circuitry is configured to drive a first receive electrode of the electrode pair, and where the controller is configured to receive output from a second receive electrode of the electrode pair.

8. The touch sensor of claim 7, where, for each respective pair of electrodes, the drive circuitry is configured to drive a first receive electrode of the electrode pair, and where the controller is configured to receive output from a second receive electrode of the electrode pair.

9. The touch sensor of claim 1, where each of the one or more jumpers is coiled.

10. The touch sensor of claim 1, further comprising a pressure-sensitive layer having an electrical resistance that varies with the applied force, and where the resistance associated with the output is a function of the electrical resistance of the one or more jumpers and the electrical resistance of the pressure-sensitive layer.

11. A method of input sensing, comprising:
    driving a transmit electrode array;
    receiving output from a receive electrode array, the transmit and receive electrode arrays formed by a plurality of electrodes; and
    determining from the output a location of a touch input based on a capacitance associated with the output, and an applied force of the touch input based on a resistance associated with the output,
    where one or more jumpers electrically couple respective pairs of electrodes, the one or more jumpers having an electrical resistance that varies with the applied force, and
    where an impedance of a capacitive path induced by driving the transmit electrode array is substantially equal to an impedance of a resistive path of the one or more jumpers.

12. The method of claim 11, where the output is a function of a complex impedance, and where determining the location and the applied force of the touch input includes solving for the capacitance and the resistance which yield the complex impedance based on a magnitude and a phase of the complex impedance.

13. The method of claim 11, further comprising driving the receive electrode array.

14. The method of claim 11, further comprising receiving output from the transmit electrode array.

15. The method of claim 11, where the respective pairs of electrodes electrically coupled by the one or more jumpers each include a transmit electrode of the transmit electrode array and a receive electrode of the receive electrode array.

16. The method of claim 11, where the respective pairs of electrodes electrically coupled by the one or more jumpers each include one of a transmit electrode pair of the transmit electrode array and a receive electrode pair of the receive electrode array.

17. A touch sensor, comprising:
    a plurality of electrodes forming a transmit electrode array and a receive electrode array;
    drive circuitry coupled to at least some of the electrodes;

receive circuitry coupled to at least some of the electrodes;

the drive circuitry being configured to drive one or more electrodes of the transmit electrode array to induce, via capacitive coupling to the receive electrode array, an output on one or more electrodes of the receive electrode array that is processed by the receive circuitry to determine a location of a touch input; and one or more jumpers electrically coupling jumpered pairs of the plurality of electrodes, the one or more jumpers having a resistance that varies with applied force, where for a given jumpered pair of the electrodes, the drive circuitry is configured to drive one electrode of the jumpered pair to induce an output on the other electrode of the jumpered pair, such output being processed at the receive circuitry to determine an applied force of the touch input, and where an impedance of a capacitive path induced by driving the transmit electrode array is substantially equal to an impedance of a resistive path of the one or more jumpers.

18. The touch sensor of claim 17, where the jumpered pairs include a first transmit electrode and a second transmit electrode.

19. The touch sensor of claim 17, where the jumpered pairs include a first receive electrode and a second receive electrode.

* * * * *